United States Patent [19]

Hosono et al.

[11] Patent Number: 4,507,694
[45] Date of Patent: Mar. 26, 1985

[54] SELECTION/DRIVE SYSTEM FOR USE IN A TAPE RECORDING/REPRODUCING APPARATUS

[75] Inventors: Toshio Hosono; Masayoshi Sakamoto; Shozo Ema, all of Tokorozawa, Japan

[73] Assignee: Pioneer Electronic Corporation, Tokyo, Japan

[21] Appl. No.: 380,944

[22] Filed: May 21, 1982

[30] Foreign Application Priority Data

May 22, 1981 [JP]  Japan .......................... 56-073210[U]

[51] Int. Cl.³ ............................................. G11B 17/00
[52] U.S. Cl. ..................................... 360/90; 360/105; 360/137
[58] Field of Search ............... 360/90, 93, 69, 74.1, 360/96.1, 96.3–96.5, 105, 137; 242/197–201, 207–209

[56] References Cited

U.S. PATENT DOCUMENTS 4,167,764  9/1979  Hanajima et al. ............. 360/105 X
4,404,610  9/1983  Koizumi et al. ................. 360/90 X
4,420,783 12/1983  Suezawa et al. ................. 360/90 X Primary Examiner—John H. Wolff

[57] ABSTRACT

An improved selection/drive system is incorporated in a magnetic tape recording/reproducing apparatus such that the apparatus may be changed into any of the stop, playback, pause, que and review operations by making use of a single drive gear rotating with a capstan. A sector gear selectively meshes with the drive gear and has first, second and third engaging stubs thereon, and first, second, third and fourth locking members interlocked with operation buttons are selectively engaged with the stubs to lock the sector gear at any of predetermined angles of rotation for establishing the stop, playback, pause, fast-forward or rewind state.

6 Claims, 8 Drawing Figures

SELECTION/DRIVE SYSTEM FOR USE IN A TAPE RECORDING/REPRODUCING APPARATUS

BACKGROUND OF THE INVENTION

This invention relates to a magnetic tape recording/reproducing apparatus, and more particularly, to a selection/drive system for use in a magnetic tape recording/reproducing apparatus in which the apparatus is changed to a desired operating state by making use of the rotational motion of a motor.

Such systems are known in the art. One exemplary system includes a drive gear adapted to be rotated by means of a motor, a sector gear adapted to mesh with the drive gear, and a cam integrally formed with the sector gear. An angular motion of the sector gear is converted into a motion required to operate the apparatus through the cam, and the converted mechanical force is used to change the apparatus into the desired state.

Such a conventional system which uses a sector gear to change the apparatus into the stop and playback states needs an additional gear for pause operation if it is desired to change the apparatus into the pause state. The system also needs an additional gear for fast-forward and rewind operations. As a result, the number of components is increased and the arrangement thereof becomes more complicated.

It is, therefore, an object of this invention to provide a selection/drive system for use in a magnetic tape recording/reproducing apparatus in which the apparatus may be changed into any of the stop, playback, pause, que and review operations by making use of a single gear.

Another object of this invention is to provide such a selection/drive system in which a reduced number of components are arranged in a simpler manner.

SUMMARY OF THE INVENTION

This invention relates to a magnetic tape recording/reproducing apparatus of the type comprising a chassis, an electric motor secured on the chassis, a head base mounted for sliding motion on the chassis, a capstan, and a pinch roller. The capstan is rotated by means of the motor and the pinch roller is moved into pressure contact with the capstan during the playback operation. According to this invention, there is provided a selection/drive system for use in such an apparatus which comprises a drive gear pivotably mounted on the chassis and adapted to be rotated by means of the motor, a sector gear pivotably mounted on the chassis, consisting of a toothed segment and a non-toothed segment, and adapted to mesh with the drive gear when the toothed segment faces the drive gear, means for moving the head base and the pinch roller to positions corresponding to predetermined angles of rotation of the sector gear, first, second and third engaging means, preferably stubs formed on the sector gear, first, second, third and fourth locking members pivoted on the chassis so as to be selectively brought into and out of engagement with any one of the first, second and third engaging stubs for locking said sector gear at the predetermined angles of rotation where the non-thoothed segment faces the drive gear, the first and second locking members being interlocked through resilient means, preferably a spring, biasing means for applying a rotational force to the sector gear in one direction when the non-toothed segment of the sector gear faces the drive gear, the biasing means, when the sector gear is unlocked, causing the sector gear to rotate an angle until it comes in mesh with the drive gear, and means for selecting one of stop, playback, pause, and fast-forward or rewind operations for the apparatus.

The first locking member is moved to a position engageable with the first stub to lock the sector gear at a first angle of rotation for establishing the stop state, in response to the selection of the stop operation by the selecting means. The second locking member is moved to a position engageable with the third stub to lock the sector gear at a second angle of rotation for establishing the playback state, in response to the selection of the playback operation by the selecting means. The third locking member is moved to a position engageable with the second stub to lock the sector gear at the first angle of rotation in response to the selection of the pause operation by the selecting means when the apparatus is in the stop state, or is moved to a position engageable with the first stub to lock the sector gear at a third angle of rotation, and causes the second locking member to pivot against the spring to thereby disengage the second locking member from the third stub in response to the selection of the pause operation when the apparatus is in the playback state. The fourth locking member is moved to a position engageable with the third stub to lock the sector gear at a fourth angle of rotation in response to the selection of the fast-forward or rewind operation by the selecting means, and further causes the second locking member to pivot against the spring to thereby disengage the second locking member from the third stub to establish the que or review state when the apparatus is in the playback state.

BRIEF DESCRIPTION OF THE DRAWINGS

The above and other objects, features and advantages of this invention will be more fully understood by reading the following description in conjunction with the accompanying drawings, in which.

DESCRIPTION OF THE PREFERRED EMBODIMENTS

Figure 1:
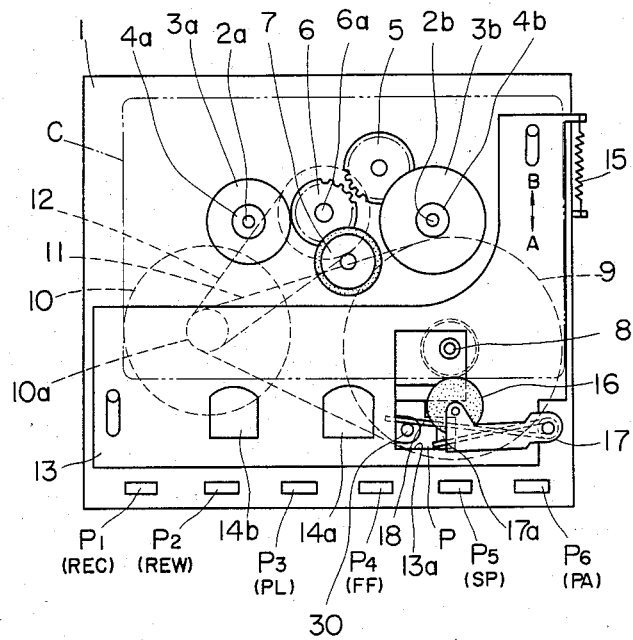
FIG. 1 is a schematic plan view of a tape recording/reproducing apparatus in which the selection/drive system of this invention is incorporated.

Referring to FIG. 1, there is shown a tape recording/reproducing apparatus including one form of the selection/drive system according to this invention. The tape recording/reproducing apparatus includes a chassis generally designated at 1. In the main surface of the chassis 1 are embedded a pair of vertically extending posts 2a and 2b, on which reel bases 3a and 3b and reel shafts 4a and 4b formed integral therewith are rotatably mounted. The reel shafts 4a and 4b are arranged such that they may engage with the corresponding reel hubs of a cassette half C shown in phantom line. It is to be noted that the reel bases 3a and 3b are supply and take-up reel bases, respectively, in the illustrated embodiment.

Intermediate the reel bases 3a and 3b, are arranged a first idle gear 5 in permanent mesh with a gear (not shown) concentric with and integrally secured to the take-up reel base 3b, a second free idle gear 6 adapted to selectively mesh with one of the first idle gear 5 and a gear (not shown) concentric with and integrally secured to the supply reel base 3a, the second free idle gear 6 being normally out of mesh with both the gears, and a free idle wheel 7 adapted to be brought in and out of contact with both a small-diameter shaft 6a of the second free idle gear 6 and the take-up reel base 3b at the circumference.

A capstan 8 is rotatably journalled in the chassis 1 and has a flywheel 9 fixedly secured to its lower end below the chassis 1. Opposite to the capstan 8, a drive motor 10 is fixedly secured to the chassis 1 and has a drive shaft having a pulley 10a secured thereto. A belt 11 is extended around the motor pulley 10a and the flywheel 9 so as to transmit rotational force of the motor 10 to the capstan 8. Another belt 12 is extended around the same pulley 10a and the second idle gear 6 so as to transmit rotational force of the motor 10 to the second idle gear 6.

On the main surface of the chassis 1, a head base 13 is provided for reciprocal motion in opposite directions shown by arrows A and B. The head base 13 is provided with magnetic heads, for example, a recording/reproducing head 14a and an erasing head 14b. The head base 13 is guided for sliding motion within a preset stroke in the directions of arrows A and B by suitable stop-in-slot means and biased in one direction by means of a spring 15 extended between the head base and the chassis 1 so that the head base may be automatically returned through the stop-in-slot means to the stop position of the apparatus as shown in FIG. 1.

Also on the main surface of the chassis 1, a pinch roller 16 corresponding to the capstan 8 is rotatably held by means of a swingable support arm 17. As more clearly seen from FIG. 2, the support arm 17 of a typical U-shaped cross section is mounted for swing motion on a pivot and provided at the lower wall with a downwardly extending cleat 17a which is received or engaged in an opening 13a in the head base 13 with a suitable clearance P. A resilient member 18 in the form of a spring is combined with the support arm 17 for providing the pressure contact of the pinch roller 16 with the capstan 8 as described later.

In FIG. 1, $P_1$, $P_2$, $P_3$, $P_4$, $P_5$, and $P_6$ designate record, rewind, playback, fast-forward, stop and pause buttons, respectively. The selection/drive system according to this invention is combined with these operating or selection buttons so that the tape recording/reproducing apparatus is brought into a state corresponding to the selected button which is pushed or actuated for the desired operation. These buttons $P_1$–$P_6$ are interlocked with rods $P_1'$–$P_6'$.

Figure 3:
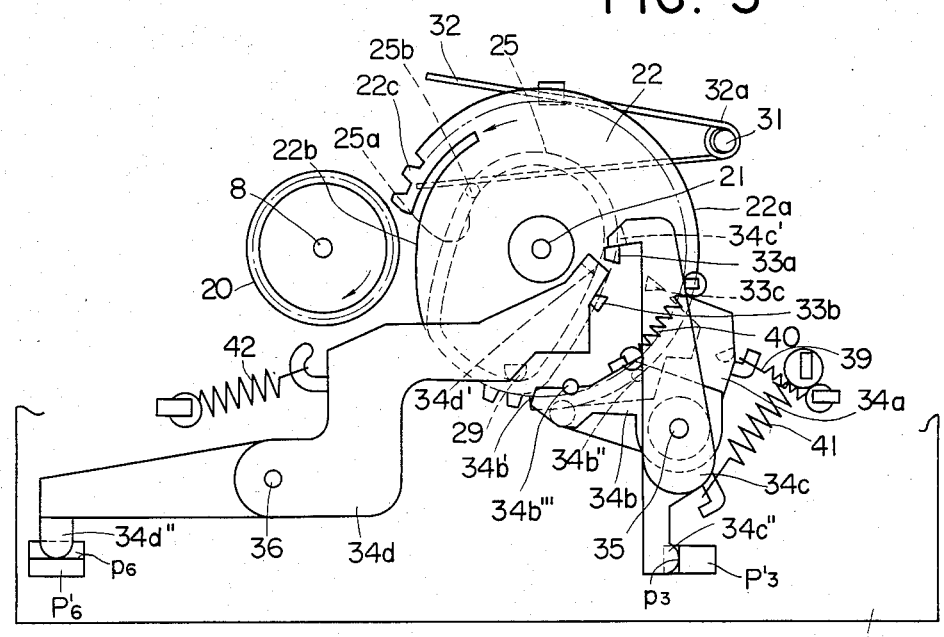
FIG. 3 is a rear view of the selection/drive system of this invention in the stop state when viewed from the rear of the apparatus of FIG. 1.

FIG. 3 illustrates the selection/drive system provided on the lower surface of the chassis 1 when viewed from the lower or rear side. The selection/drive system is shown as being in the stop state where the tape recording/reproducing apparatus is at rest.

In FIG. 3, the capstan shaft 8 having the flywheel 9 fixedly secured thereto is also provided with a drive gear 20 coaxial with the flywheel. On a pivot 21 projecting from the lower surface of the chassis 1 is rotatably mounted a partially cut-out or sector gear 22 consisting of a toothed segment 22a and a cut-out or non-toothed segment 22b. The drive gear 20 and the gear 22 are arranged such that the toothed segment 22a meshes with the gear 20 when the former faces the latter. The cut-out segment 22b occupies a segment of the gear 22 included an angle of approximately 90°, and that part of the toothes segment 22a which is located adjacent the cut-out segment 22b is undercut to provide a free toothed portion 22c which allows the sector gear 22 to come in mesh with the gear 20 in a smooth manner.

Figure 4:
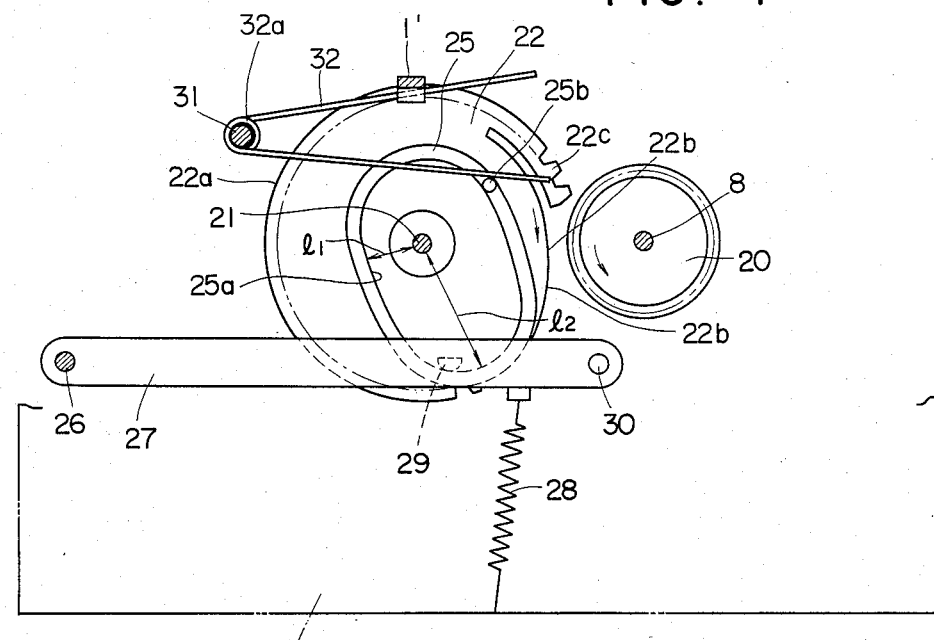
FIG. 4 is a plan view of the selection/drive system of FIG. 3 when viewed from the front of the apparatus of FIG. 1, with the chassis omitted.

FIG. 4 illustrates the selection/drive system with the chassis 1 and the head base 13 omitted when viewed from the above as in FIG. 1. More particularly, the sector gear 22 is shown in combination with a pinch roller controlling lever 27 which is adapted to be moved with rotation of the sector gear 22. The selection/drive system is illustrated in the stop state of the tape recording/reproducing apparatus as in FIG. 3.

Figure 2:
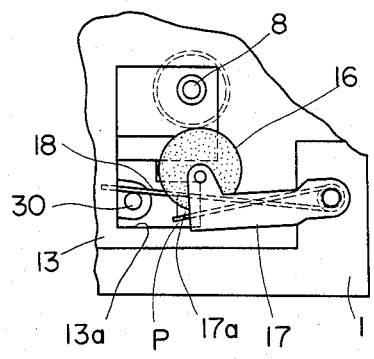
FIG. 2 is an enlarged plan view showing a part of the apparatus of FIG. 1 including a capstan and a pinch roller.

As shown in FIG. 4, on the upper surface of the sector gear 22 facing the chassis 1, the sector gear 22 is provided with an oval rim 25 including portions having a short radius $l_1$ and a long radius $l_2$ as shown in FIG. 4. The oval rim 25 includes an inner circumferential surface 25a acting as a cam surface. The lever 27 at its one end is rotatably mounted on a pivot 26 projecting from the chassis 1 and at the other end is connected to a spring 28 which is in turn secured to the chassis 1 to bias the lever clockwise when viewed in FIG. 4. The lever 27 is provided intermediate the both ends with a cam follower in the form of a downwardly extending guide pin 29 which is in resilient contact with the cam surface 25a. The lever 27 is also provided at the other end with an upwardly extending pin 30 which is inserted in the head base opening 13a through an opening (not shown) in the chassis 1 as shown in FIGS. 1 and 2.

A torsion coil spring 32 at its coiled portion 32a is loosely supported on a post 31 projecting from the chassis 1. One end of the spring 32 is engaged with an upright piece 1' on the chassis 1, while the other end is extended between the chassis 1 and the sector gear 22 so that it may be engaged with a pin 25b on the rim 25 at least when the cut-out segment 22b of the sector gear 22 faces the drive gear 20. Through this engagement, the spring 32 functions to apply a rotational force to the sector gear 22. With the point of engagement as shown in FIG. 4, a rotational force as shown by an arrow is applied to the sector gear 22.

Referring again to FIG. 3, on the surface of the sector gear 22 remote from the chassis 1, the sector gear 22 is provided with three engaging stubs 33a, 33b and 33c. The first and second stubs 33a and 33b are spaced apart a short distance on a common circle with respect to the pivot 21, and the third stub 33c is located outside and adjacent the stubs 33a and 33b. The stubs 33a, 33b and 33c cooperate with locking members 34a, 34b, 34c and 34d to lock the sector gear 22 at any of the predetermined angles of rotation as described later.

Further pivots 35 and 36 project from the lower surface of the chassis 1. The locking members 34a, 34b and 34c are pivotably mounted on the pivot 35 in this order from the side nearer to the chassis 1, and the remaining locking member 34d is pivotably mounted on the other pivot 36. It is to be noted that the locking members 34a, 34b, 34c, and 34d function to establish the que/review, playback, stop, and pause states, respectively.

Figure 5:
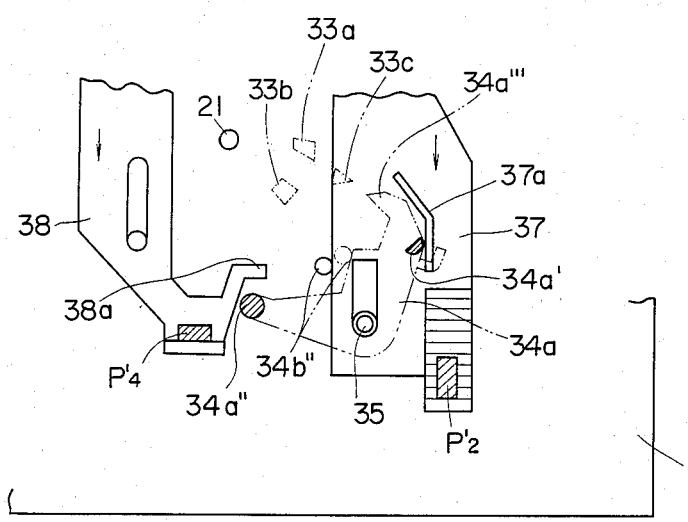
FIG. 5 is a view showing fast-forward and rewind slide members in connection with a locking member when taken in the same direction as in FIG. 3.

Also included are a slide members 37 and 38 for rewind and fast-forward operations which are provided for sliding motion on the chassis 1 as shown in FIG. 5. The slide members 37 and 38 may be slided in a direction shown by arrows against the biasing force of springs (not shown) by means of the interlocking rods $P_2'$ and $P_4'$ which are, in turn, moved in response to pushing of the rewind button $P_2$ and fast-forward button $P_4$.

The above-mentioned locking member 34a for que/review operation is of a substantially L-shaped, mounted at the bend on the pivot 35, and biased clockwise by means of a spring 39 (see FIG. 3) to bring a first guide pin 34a' projecting from one arm toward the chassis 1 in resilient contact with a guide wall 37a on the slide member 37. The locking member 34a also has a second guide pin 34a'' projecting from the end of the other arm toward the chassis 1 and coacting with the other slide member 38. If the slide member 37 or 38 slidingly moves in the direction shown by an arrow, the first or second guide pin 34a' or 34a'' is engaged with and driven by the guide wall 37a of the slide member 37 or a guide arm 38a of the slide member 38, causing the locking member 34a to rotate counterclockwise against the action of the spring 39 to such an extent that a hook 34a''' at the end of one arm of the locking member 34a is moved to a position crossing the path of rotation of the stub 33c on the sector gear 22.

Between the locking member 34b for play operation and the locking member 34c for stop operation is connected a spring 40 for pulling these members in resilient contact at their abutments so as to define a predetermined angle therebetween. Between the locking member 34c and an upright piece on the chassis 1 is connected another spring 41 for applying a counterclockwise rotational force to the locking member 34c to bring the locking member 34c at its abutment 34c'' in resilient contact with a tapered cam surface $p_3$ on the rod $P_3'$ interlocked with the button $P_3$ for playback operation. Where the abutment 34c'' of the locking member 34c is in resilient contact with the cam surface $P_3$ of the rod $P_3'$ retracted as shown in FIG. 3, a jaw 34c' at the other end of the locking member 34c is at a position crossing the path of rotation of the stub 33a on the sector gear 22, and an engaging end 34b' of the locking member 34b is off the position crossing the path of rotation of the stub 33c on the sector gear 22.

The locking members 34b and 34c are provided such that when the playback button $P_3$ (FIG. 1) is pushed or actuated, the interlocking rod $P_3'$ is moved from the back to the front of the sheet of FIG. 3 to cause the locking members to pivot clockwise against the action of the spring 41 through the sliding engagement with the tapered cam surface $p_3$ on the rod $P_3'$. Then the engaging end 34b' of the locking member 34b is at the position crossing the path of rotation of the stub 33c on the sector gear 22, and the jaw 34c' of the locking member 34c is off the position crossing the path of rotation of the stub 33a on the sector gear 22.

The above-described pivotal motion of the locking member 34b causes the pin 34b'' projecting therefrom to abut the edge of the locking member 34a as shown by phantom line in FIG. 5. If the locking member 34a is pivoted counterclockwise under this condition, the locking member 34b is thereby pivoted counterclockwise to move the engaging end 34b' of the locking member 34b out of the position crossing the path of rotation of the stub 33c.

The locking member 34d for pause operation is pivotably mounted on the pivot 36 substantially at the center and is biased counterclockwise by means of a spring 42 connected between the locking member 34d and an upright piece on the chassis 1. The locking member 34d is held at the illustrated position while its abutment 34d''' is in resilient abutment with a tapered cam surface $p_6$ on the rod $P_6'$ interlocked with the pause button $P_6$. In this condition, a lug 34d' at the other end of the locking member 34d is off the position crossing the path of rotation of the stubs 33a and 33b on the sector gear 22. When the pause button $P_6$ is pushed to move the interlocking rod $P_6'$ from the back to the front of the sheet of FIG. 3, the tapered cam surface $p_6$ at a raised portion engages the abutment 34d''' of the locking member 34d to thereby pivot the locking member 34d clockwise against the action of the spring 42, placing the lug 34d' at the position crossing the path of rotation of the stubs 33a and 33b on the sector gear 22.

Figure 6:
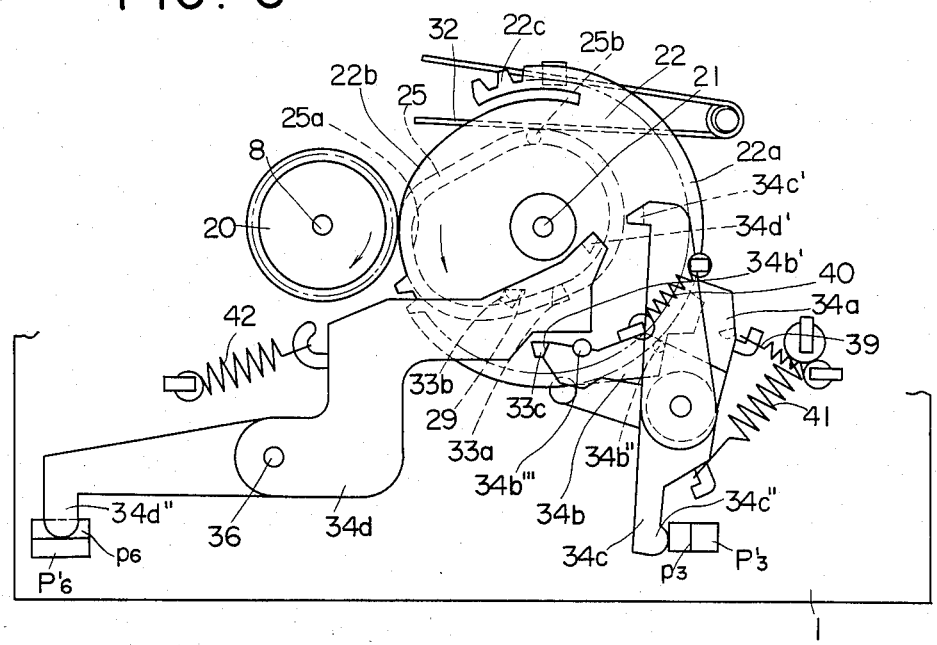
FIG. 6 is a rear view of the selection/drive system similar to FIG. 3, the system being in the playback state.

The pivotal motion of the locking member 34d causes an edge thereof to approach an engaging pin 34b'''' on the locking member 34b. With the apparatus at rest as shown in FIG. 3, the locking member 34b is not moved thereby at all. However, in the playback state wherein the locking member 34b engages the third stub 33c as shown in FIG. 6, the pivotal motion of the locking member 34d causes the locking member 34b to pivot counterclockwise against the action of the spring 40, disengaging the locking member 34b from the stub 33c.

Figure 7:
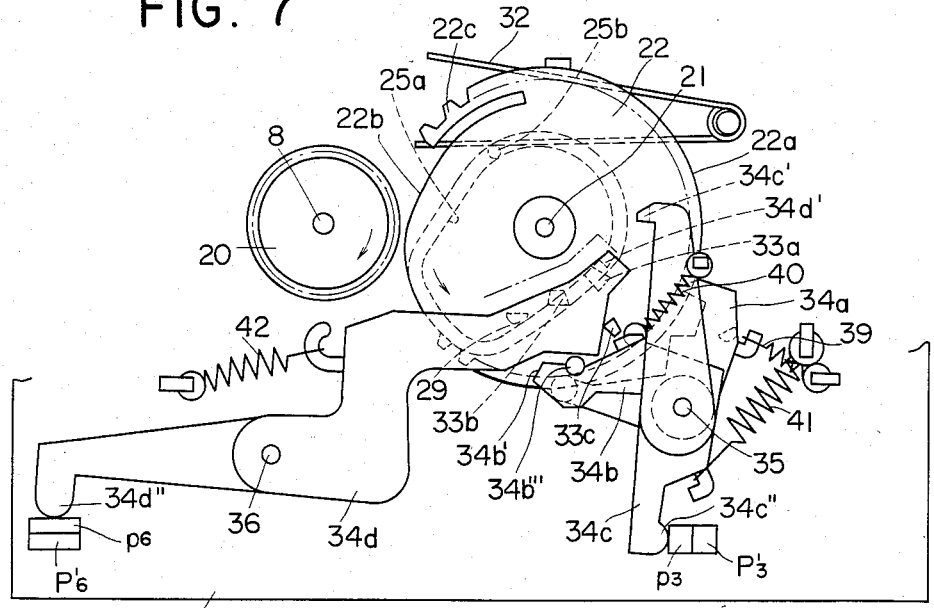
FIG. 7 is a rear view of the selection/drive system similar to FIG. 3, the system being in the pause state.

The relationship of the angles of rotation of the sector gear 22 to the positions of the head base 13 and the pinch roller 16 is now described. At the first angle of rotation of the sector gear 22 where the locking member 34c engages the first stub 33a, the cam follower 29 on the lever 27 is in resilient contact with the long radius portion of the cam surface 25a (see FIG. 4). Then the head base 13 is restored to the stop position by means of the spring 15 with the pinch roller 16 spaced apart from the capstan 8. At the second angle of rotation of the sector gear 22 where the locking member 34b engages the third stub 33c, the cam follower 29 on the lever 27 is in resilient contact with the short radius portion of the cam surface 25a as shown in FIG. 6. Then the head base 13 is moved to the playback position against the action of the spring 15 with the pinch roller 16 in pressure contact with the capstan 8. At the third angle of rotation of the sector gear 22 where the locking member 34d engages the first or second stub 33a or 33b, the cam follower 29 on the lever 27 is in resilient contact with the relatively long radius portion of the cam surface 25a as shown in FIG. 7. Then the head base 13 and the pinch roller 16 are held at substantially the same positions as in the stop state, establishing the pause state. At the fourth angle of rotation of the sector gear 22 where the locking member 34a engages the third stub 33c, the cam follower 29 on the lever 27 is in resilient contact with the relatively short radius portion of the cam surface 25a. Then the head base 13 is held to place the magnetic heads 14a and 14b in contact with the tape, while the pinch roller 16 is spaced apart from the capstan 8. This results in the rewind or fast-forward state depending on the actuated one of the rewind and fast-forward buttons $P_2$ and $P_4$ when the playback button $P_3$ has not been pushed, or results in the que or review state when the playback button $P_3$ has been pushed.

With the above arrangement, the selection/drive system according to this invention will be operated as follows.

It is assumed that the apparatus is loaded with the cassette half C with its reel hubs mating the reel bases 3a and 3b and the motor 10 is energized. First described is how to change the apparatus from the stop state shown in FIG. 3 to the playback state shown in FIG. 6.

In the state shown in FIG. 3, if the playback button $P_3$ (FIG. 1) is now pushed, the rod $P_3'$ interlocked therewith is locked depressed and urges the locking member 34c clockwise (in FIG. 3) against the spring 41 by way of the tapered cam surface $p_3$, disengaging the locking member 34c from the stub 33c on the sector gear 22. With the clockwise motion of the locking member 34c, the locking member 34b is pivoted to place its engaging end 34b' at the position crossing the path of rotation of the third stub 33c.

The disengagement of the locking member 34c from the first stub 33a allows the sector gear 22 to rotate in the direction of an arrow due to the biasing force of the spring 32 to bring the free toothed portion 22c in mesh with the drive gear 20. As a result of this meshing, the sector gear 22 is forcedly rotated until its toothed segment 22a at the trailing edge is disengaged from the drive gear 20. At this point, as shown in FIG. 6, the locking member 34b at its engaging end 34b' engages the third stub 33c to preclude rotation of the sector gear 22. Since the cam follower 29 on the lever 27 is in resilient contact with the short radius portion of the oval cam surface 25a in this condition, the pin 30 on the lever 27 is moved toward the capstan 8 to the position where the pinch roller 16 is placed in pressure contact with the capstan 8 by way of the spring 18 (see FIGS. 2 and 4). At the same time, the head base 13 is moved toward the cassette half C against the spring 15. The tape is moved at constant speed past the magnetic heads 14a and 14b in a sliding contact relationship while it is pulled by means of the pinch roller 16 in pressure contact with the capstan 8.

To restore the apparatus from the playback state shown in FIG. 6 to the stop state shown in FIG. 7, the stop button $P_5$ (FIG. 1) is pushed to cancel locking of the playback button $P_3$ and allow the playback button $P_3$ to automatically return to the initial. As the playback button $P_3$ returns in place, the rod $P_3'$ interlocked therewith is moved from the front to the back of the sheet of FIG. 6, the locking member 34c and 34b are pivoted counterclockwise by means of the spring 41, thereby disengaging the locking member 34b from the third stub 33c and moving the jaw 34c' of the locking member 34c to the position crossing the path of rotation of the first stub 33a. The disengagement of the locking member 34b from the stub 33c allows the sector gear 22 to rotate in the direction of an arrow due to the action of the spring 32 until the first stub 33a engages the locking member 34c at its jaw 34c'. At this point, the sector gear 22 is stopped to establish the stop state.

The tape recording/reproducing apparatus may be changed into the pause state in two different ways from either the stop state or the playback state.

In the first way of changing, the apparatus is in the stop state. When the pause button $P_6$ (FIG. 1) is pushed, the pause button $P_6$ is locked depressed and the rod $P_6'$ interlocked therewith causes the locking member 34d to pivot clockwise against the action of the spring 42 by way of the tapered cam surface $p_6$. Then the locking member 34d engages the stub 33b on the sector gear 22. In this condition, even when the playback button $P_3$ is pushed to pivot the locking member 34c to disengage the locking member 34c from the first stub 33a, the sector gear 22 is kept unchanged without any angular motion. As shown in FIG. 7, the locking member 34b whose pin 34b''' is in abutment with the locking member 34d is not pivoted with the locking member 34c and kept in the same position as shown in FIG. 3, with the spring 40 being stretched.

With the playback button $P_3$ pushed, the pause button $P_6$ is pushed again to release locking for the purpose of cancelling the pause state, and then the pause button $P_6$ and the interlocking rod $P_6'$ automatically return in place. Then the locking member 34d is pivoted counterclockwise by means of the spring 42 to disengage the locking member 34d from the stub 33b. With the pivotal motion of the locking member 34d, the locking member 34b is pivoted clockwise by means of the spring 40 to move the engaging end 34b' of the locking member 34b to the position crossing the path of rotation of the stub 33c. At the same time, the sector gear 22 is rotated in the direction of an arrow by means of the spring 32 so that it meshes with the drive gear 20. The sector gear 22 is then rotated until its toothed segment 22a at its trailing edge is disengaged from the gear 20. At this point, the sector gear 22 which is out of engagement with the drive gear 20 is held in the state shown in FIG. 6 wherein the locking member 34b engages the third stub 33c. The apparatus is in the playback state.

If the pause button $P_6$ is pushed and locked during such playback operation, the locking member 34d is pivoted against the action of the spring 42 and moved to the position crossing the path of rotation of the stub 33a. During this pivotal motion, the locking member 34d at the edge abuts the pin 34b''' to pivot the locking member 34b counterclockwise against the action of the spring 40, disengaging the locking member 34b from the stub 33c. As a result, the sector gear 22 is rotated in the direction of an arrow due to the biasing force of the spring 32 and stopped rotating or locked when the stub 33a abuts the locking member 34d at the lug 34d' as shown in FIG. 7. Since the cam follower pin 29 on the lever 27 is in resilient contact with the long radius portion of the oval cam surface 25a in this condition, the head base 13 and the pinch roller 16 are kept at substantially the same positions as in the stop state.

When the pause button $P_6$ is pushed again to release locking for the purpose of cancelling the this pause state, the locking member 34d is pivoted counterclockwise from the position shown in FIG. 7 so that it is disengaged from the first stub 33a. Further, this pivotal motion of the locking member 34d allows the locking member 34b to pivot clockwise due to the biasing force of the spring 40, thereby moving the engaging end 34b' of the locking member 34b to the position crossing the path of rotation of the stub 33c. Consequently, the sector gear 22 is brought in mesh with the drive gear 20 by means of the spring 32 and then rotated with the drive gear 20 until the sector gear is released from the drive gear. At this point of release, the stub 33c engages the locking member 34b to lock the sector gear 20, establishing the playback state again.

Next, the operation following pushing of the rewind or fast-forward button P2 or P4 is described.

Figure 8:
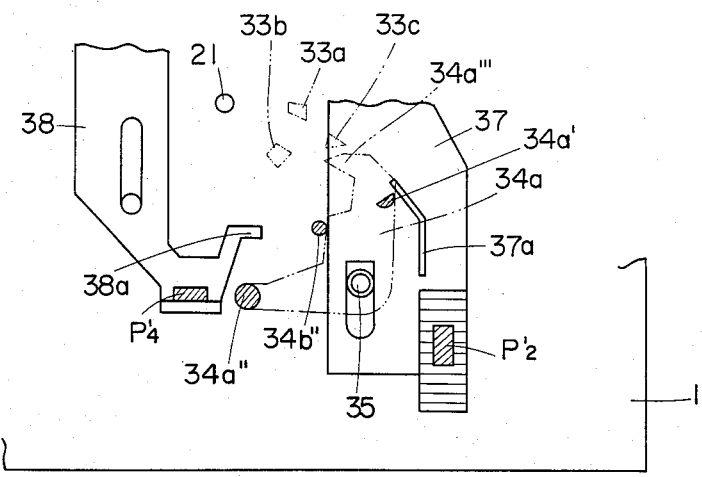
FIG. 8 is a view similar to FIG. 5 with the rewind slide member actuated.

With the apparatus in the stop state shown in FIG. 3, when the rewind or fast-forward button P2 or P4 is pushed into the locked position, the corresponding slide member 37 or 38 is slidingly moved as shown in FIG. 5 causing the locking member 34a to pivot counterclockwise against the action of the spring 39 to the position crossing the path of rotation of the stub 33c. FIG. 8 illustrates how the slide member 37 and the locking member 34a are moved when the rewing button P2 is pushed. Since the engagement of the locking member 34c with the stub 33a is continued, the rewind or fast-forward operation is performed with the sector gear 22 being kept unchanged. The rewind or fast-forward state may be cancelled by pushing either the stop or playback button P5 or P3 to release locking of the rewind or fast-forward button P2 or P4. The tape recording/reproducing apparatus is changed into the stop or playback state.

With the tape recording/reproducing apparatus in the playback state as shown in FIG. 6, if the rewind or fast-forward button P2 or P4 is pushed, the locking member 34a is pivoted as in the foregoing operation. During this pivotal motion, the locking member 34a abuts the locking member 34b at its pin 34b'' to pivot the latter counterclockwise, thereby disengaging the locking member 34b from the third stub 33c. Then, the sector gear 22 is rotated due to the biasing force of the spring 32 and stopped rotating when the third stub 33c engages the locking member 34a. Since the cam follower pin 29 on the lever 27 is in resilient contact with the relatively short radius portion of the cam surface 25a in this condition (although not shown in the figures), the head base 13 is moved forward from the position shown in FIG. 1 so that the magnetic heads 14a and 14b may be in contact with the tape and the pinch roller 16 be spaced apart from the capstan 8. Consequently, depending upon the actuated one of the rewind and fast-forward buttons P2 and P4, the review or que operation is performed.

During the que and review operations, the fast-forward and rewind buttons P4 and P2 are unlocked. By releasing pushing of such a button, the locking member 34a is pivoted clockwise by means of the spring 39, and at the same time, the locking member 34b is pivoted clockwise by means of the spring 40 and eventually to the position crossing the path of rotation of the third stub 33c. Consequently, the sector gear 22 is restored to the playback position as shown in FIG. 3.

When it is desired to detect intervals between recorded sections of a tape and to start playback operation at any desired interval, the fast-forward or rewind button P4 or P2 must be locked during the above-described que or review operation. Then the locking will be automatically released in response to the detection of a desired interval.

As described above, the improved selection/drive system of the present invention for use in a tape recording/reproducing apparatus is capable of establishing the pause, que and review states as well as the stop and playback states by using a single sector gear, and is of a simple structure requiring a smaller number of parts, contributing to substantial reduction in size and cost.

What is claimed is:

1. In a magnetic tape recording/reproducing apparatus comprising a chassis, an electric motor fixedly secured on the chassis, a head base mounted for sliding motion on the chassis, a capstan adapted to be rotated by means of the motor, and a pinch roller adapted to be swung into and out of pressure contact with the capstan, a selection/drive system comprising a drive gear pivotably mounted on the chassis and adapted to be rotated by means of the motor, a sector gear pivotably mounted on the chassis, consisting of a toothed segment and a non-toothed segment, and adapted to mesh with said drive gear when the toothed segment faces said drive gear, means for moving the head base and the pinch roller to positions corresponding to predetermined angles of rotation of said sector gear, first, second and third engaging means formed on said sector gear, first, second and third locking members pivoted on the chassis so as to be selectively brought into and out of engagement with any one of said first, second and third engaging means for locking said sector gear at the predetermined angles of rotation where the non-toothed segment faces said drive gear, said first and second locking members being interlocked through resilient means, biasing means for applying a rotational force to said sector gear in one direction when the non-toothed segment of said sector gear faces said drive gear, said biasing means, when said sector gear is unlocked, causing said sector gear to rotate until it comes in mesh with said drive gear, and means for selecting one of stop, playback and pause operations for the apparatus, wherein said first locking member is moved to a position engageable with said first engaging means to lock said sector gear at a first angle of rotation for establishing the stop state, in response to the selection of the stop operation by said selecting means, said second locking member is moved to a position engageable with said third engaging means to lock said sector gear at a second angle of rotation for establishing the playback state, in response to the selection of the playback operation by said selecting means, and said third locking member is moved to a position engageable with said third engaging means to lock said sector gear at the first angle of rotation in response to the selection of the pause operation by said selecting means when the apparatus is in the stop state, or is moved to a position engageable with said first engaging means to lock said sector gear at a third angle of rotation, and causes said second locking member to pivot against said resilient means to thereby disengage said second locking member from said second engaging means in response to the selection of the pause operation when the apparatus is in the playback state.

2. In a magnetic tape recording/reproducing apparatus comprising a chassis, an electric motor fixedly secured on the chassis, a head base mounted for sliding motion on the chassis, a capstan adapted to be rotated by means of the motor, and a pinch roller adapted to be swung into and out of pressure contact with the capstan, a selection/drive system comprising a drive gear pivotably mounted on the chassis and adapted to be rotated by means of the motor, a sector gear pivotably mounted on the chassis, consisting of a toothed segment and a non-toothed segment, and adapted to mesh with said drive gear when the toothed segment faces said drive gear, means for moving the head base and the pinch roller to positions corresponding to predetermined angles of rotation of said sector gear, first, second and third engaging means formed on said sector gear, first, second, third and fourth locking members pivoted on the chassis so as to be selectively brought into and out of engagement with any one of said first, second and third engaging means for locking said sector gear at the predetermined angles of rotation where the non-toothed segment faces said drive gear, said first and second locking members being interlocked through resilient means, biasing means for applying a rotational force to said sector gear in one direction when the non-toothed segment of said sector gear faces said drive gear, said biasing means, when said sector gear is unlocked, causing said sector gear to rotate until it comes in mesh with said drive gear, and means for selecting one of stop, playback, pause, fast-forward and rewind operations for the apparatus, wherein said first locking member is moved to a position engageable with said first engaging means to lock said sector gear at a first angle of rotation for establishing the stop state, in response to the selection of the stop operation by said selecting means, said second locking member is moved to a position engageable with said third engaging means to lock said sector gear at a second angle of rotation for establishing the playback state, in response to the selection of the playback operation by said selecting means, said third locking member is moved to a position engageable with said third engaging means to lock said sector gear at the first angle of rotation in response to the selection of the pause operation by said selecting means when the apparatus is in the stop state, or is moved to a position engageable with said first engaging means to lock said sector gear at a third angle of rotation, and causes said second locking member to pivot against said resilient means to thereby disengage said second locking member from said second engaging means in response to the selection of the pause operation when the apparatus is in the playback state, and said fourth locking member is moved to a position engageable with said third engaging means to lock said sector gear at a fourth angle of rotation in response to the selection of the fast-forward or rewind operation by said selecting means, and further causes said second locking member to pivot against said resilient means to thereby disengage said second locking member from said second engaging means to establish the cue or review state when the apparatus is in the playback state.

3. A selection/drive system according to claim 2 wherein said first, second and fourth locking members are mounted on a common pivot.

4. A selection/drive system according to claim 2 wherein said selecting means includes stop, playback, pause, fast-forward and rewind buttons, and said first locking member is interlocked with the playback button, said third locking member is interlocked with the pause button, and said fourth locking member is interlocked with the fast-forward and rewind buttons.

5. A selection/drive system according to claim 1 or 2 wherein said first, second and third engaging means are in the form of a stub standing on the surface of said sector gear.

6. A selection/drive system according to claim 1 or 2 wherein said drive gear is mounted on the capstan shaft.

* * * * *